United States Patent [19]

Slaughter et al.

[11] 4,087,508
[45] May 2, 1978

[54] INJECTION WELDING APPARATUS

[75] Inventors: William George Frederick Slaughter, Whitton; Peter William Pledger; John Patrick Auriole Lowry, both of London, all of England

[73] Assignee: The Post Office, London, England

[21] Appl. No.: 755,993

[22] Filed: Jan. 3, 1977

[51] Int. Cl.$^2$ .................. B29C 5/00; B29C 27/00; B29F 1/00

[52] U.S. Cl. ................. 264/262; 264/272; 264/329; 425/127; 425/129 R

[58] Field of Search ............ 264/261, 262, 272, 328, 264/329; 425/117, 127–129, 802, 129 R; 156/49, 245, 502

[56] References Cited

U.S. PATENT DOCUMENTS

| | | | |
|---|---|---|---|
| 2,444,075 | 6/1948 | Violette | 264/261 |
| 2,501,863 | 3/1950 | Cox | 425/129 |
| 2,716,623 | 8/1955 | Tator | 174/84 R |
| 3,368,006 | 2/1968 | Gill | 264/261 |
| 3,568,246 | 3/1971 | David | 425/129 |

FOREIGN PATENT DOCUMENTS

| | | | |
|---|---|---|---|
| 221,764 | 9/1957 | Australia | 156/49 |
| 326,684 | 3/1930 | United Kingdom | 174/84 |

*Primary Examiner*—Willard E. Hoag
*Attorney, Agent, or Firm*—Hall & Houghton

[57] ABSTRACT

A mould for injection welding a junction between a thermoplastics sleeve and a cable having an outer sheath of thermoplastics material, which mould comprises three parts: one part is heat-conductive with a bore for receiving the end of the cable; one part is heat-insulating with a bore for receiving the sleeve, and the final part is heat-conductive with an enlarged bore for surrounding the actual joint. When the mould is assembled, this final part receives the ends, at least, of the other two parts and prevents relative axial and radial movement between the mould parts.

14 Claims, 12 Drawing Figures

INJECTION WELDING APPARATUS

This invention relates to a mould and a mould assembly for use in welding a junction formed by insertion of an end portion of a thermoplastics sheathed cable into an end portion of a thermoplastics sleeve.

Known mould assemblies for use in making injection welds between a polyethylene sheathed cable or cables and a polyethylene sleeve have required the use of a preformed adaptor or a tapered collar to bridge the gap between the sleeve and the cable(s), thereby to provide a uniform or non-uniform outer taper from the sleeve diameter to the cable diameter in the region of the cable/sleeve junction. Such assemblies have required that there be a multiplicity of welds at a junction to avoid use of excess injectant.

In addition use of a collar or adaptors at a cable/sleeve junction can severely hamper access to the welds for breaking open the junction when at a later stage further cables are required to be inserted into the sleeve or existing cables need to be removed. This is important since in cable planning there must be a facility for adding or withdrawing cables from a junction to suit the economic provision of cables in various stages of a cable network's life. After breaking open such a junction the adaptors or tapered collar must usually be discarded and replaced by new adaptors or tapered collar compatible with the dimensions of the sleeve and the diameters of the cables. Such replacement can thus be very expensive.

By use of the mould and mould assembly of the invention it is sought to obviate the disadvantages of using adaptors and tapered collars as described above.

According to one aspect of the invention there is provided a mould for injection welding a junction between the end portion of at least one cable, having an outer sheath of thermoplastics material, and a sleeve also of thermoplastics material; the mould comprising first, second and third mould parts, the first part being of heat-conductive material with a bore for receiving the cable end portion and the third part being of heat-insulating material with a bore for receiving the sleeve, the second part being of heat-conductive material with a bore of larger diameter than those of the bores of the first and third parts and being shaped at opposite ends thereof to receive at least an end portion of the first and third parts, the second part co-operating with the first and third parts whereby, in use, relative axial and radial movement between the said parts is prevented.

In one embodiment of the invention, the first mould part has a inlet port for admitting molten thermoplastics material into the bore, the inlet port being at a location spaced apart from the region of co-operation between the first and second mould parts. In another embodiment, the second mould part has an inlet port for admitting molten thermoplastics material into the bore, a substantial portion of the first mould part being located within the second mould part.

Preferably the second mould part includes means for heating the block and means for cooling the block.

The mould may include a rigid bearing cylinder locatable within the thermoplastics sleeve to provide a support therefor, to which the mould may be clamped.

The mould may include a sealing member locatable within the mould to prevent ingress of molten thermoplastics to the inside of the thermoplastics sleeve. The sealing member may have a portion shaped to extend between the or each cable and the thermoplastics sleeve, a circumferential lip securable to the thermoplastics sleeve, and at least one portion shaped, or deflectable, to provide an upstanding portion to surround the or a cable.

The mould can further include a piston-and-cylinder assembly connected to the inlet port and operable to force molten thermoplastics material through the inlet port, a part of the cylinder being of multi-bore formation whereby molten thermoplastics material being forced through the cylinder undergoes turbulence.

A method of injection welding a cable/sleeve junction using a mould in accordance with the invention includes the steps of forming the junction by inserting the cable end portion partially into an end of the sleeve, locating the mould at the junction so that the first, second and third parts of the mould surround, respectively the cable, the junction and the sleeve and provide a mould cavity which has a maximum radial extension adjacent the junction, and injecting molten thermoplastics material into the mould cavity.

The present invention also provides a method of injection welding, in which the mould is sealed around the cable and around the sleeve at locations spaced from the junction.

Embodiments of the invention will now be described by way of example with reference to the accompanying diagrammatic drawings in which:

FIG. 5A is an isometric view.

Figure 1:
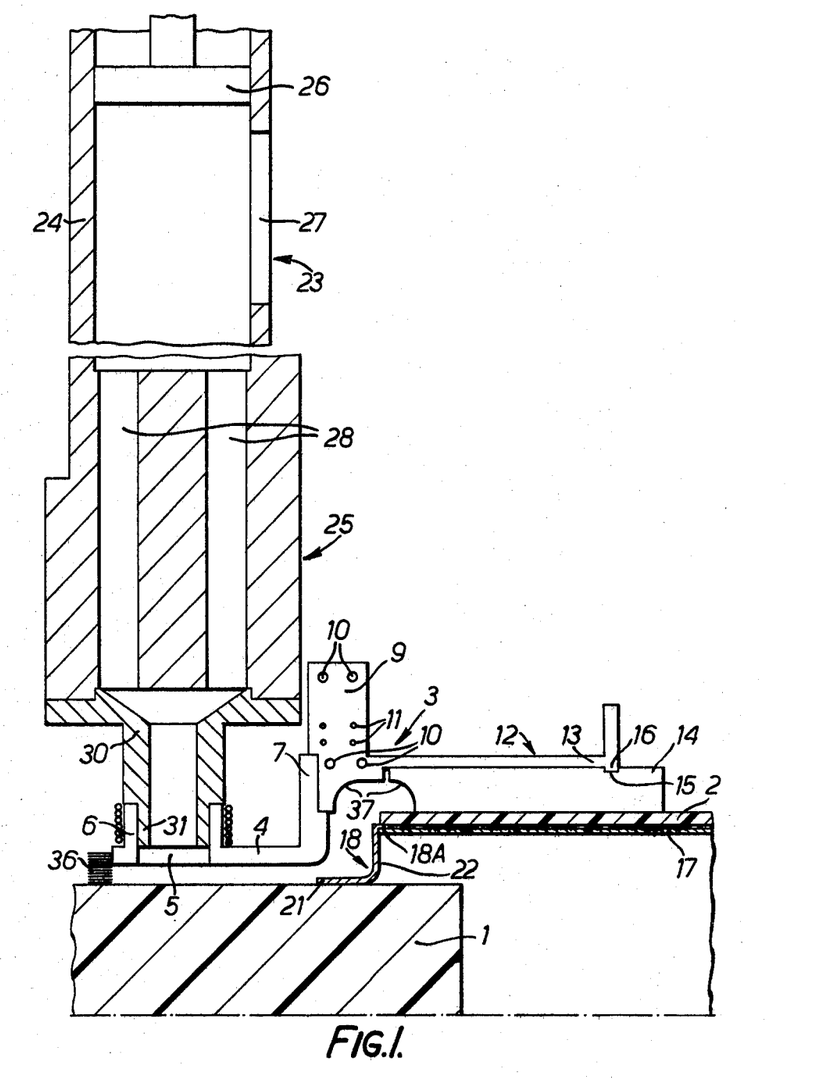
FIG. 1 is a sectional view showing part of a mould according to the invention assembled around a cable/sleeve junction.

Referring to the drawings in detail, FIG. 1 shows a polyethylene sheathed cable 1 with its end inserted into the end of a polyethylene sleeve 2.

A mould 3 is clamped around the junction between the cable 1 and the sleeve 2 and extends some way along both the cable and the sleeve.

Figure 2:
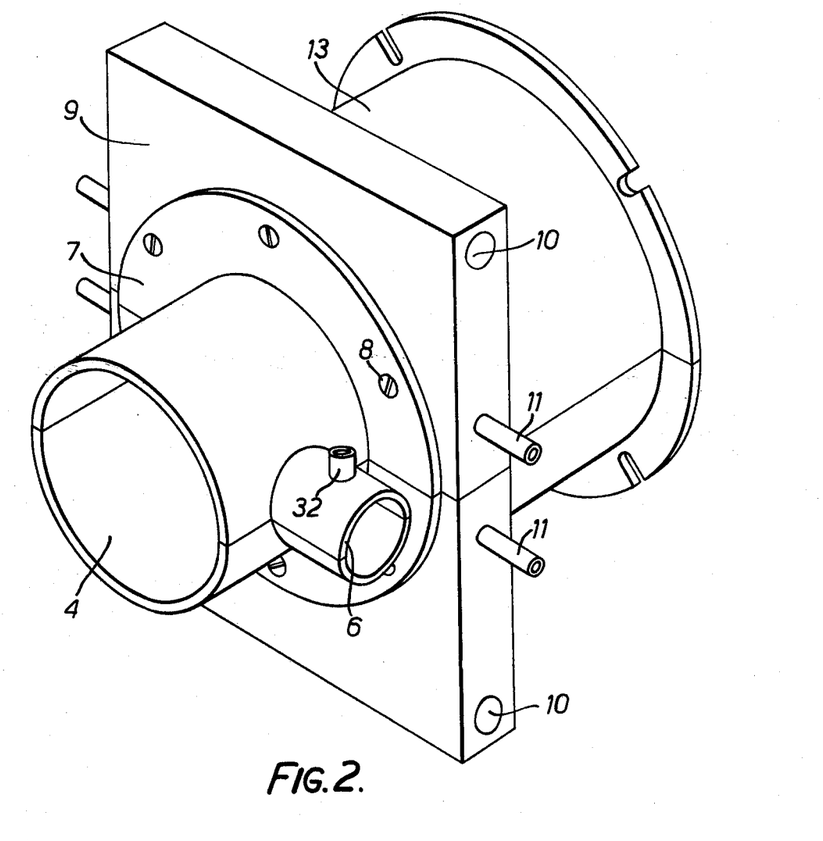
FIG. 2 is an isometric view of a mould according to the invention.

The mould has an aluminium first section 4 which is of cylindrical form and has a cylindrical bore with a diameter which exceeds the diameter of the cable 1 by a present amount. The mould section 4 is split longitudinally into two parts as shown in FIG. 2 and has an inlet port 5 extending through its side wall adjacent one end to allow for injection of molten polyethylene into the mould. An upstanding hollow stem 6, formed integrally with the mould section 4, surrounds the inlet port 5. The other end of the mould section 4 has an integral radially-extending flange 7 through which extend bolt holes 8 (FIG. 2) to enable the mould section 4 to be bolted to (and, if required, removed from) a central mould section 9. In order to accommodate different sizes of cable, a range of mould sections 4 of varied sizes may be provided, the mould sections 4 having in all cases a flange 7 adapted to be bolted to the mould section 9 as shown in FIG. 1.

The central mould section 9 is also split longitudinally and is in the form of a rectangular aluminium block (though a cylindrical block may be utilised) from which extends an integral cylindrical member 13, and has a cylindrical bore with a larger diameter than that of the bore of the mould section 4. The block 9 houses cartridge heaters 10 for heating the block and for heating molten polyethylene in contact with it. The block also houses ducts 11 through which cooling fluid can be circulated to cool the block and the polyethylene.

The mould 3 has a third section 12 which comprises a nylon heat-insulating sleeve 14 which fits snugly over the sleeve 2 and within the member 13. The longitudinally-split nylon sleeve has an annular recess 15 extending around it in which is located an annular projection 16 integral with the member 13. The inter-engagement between the recess and the projection prevents the nylon sleeve 14 for sliding longitudinally relative to the sleeve 2. The internal diameter of the sleeve 14 is somewhat less than the diameter of the bore in the block 9.

Concentrically disposed within the sleeve 2 is a hollow rigid bearing cylinder or former 17. The cylinder 17 forms a support for the third section 12 of the mould when it is clamped to the sleeve 2 as described below.

Figure 3A:
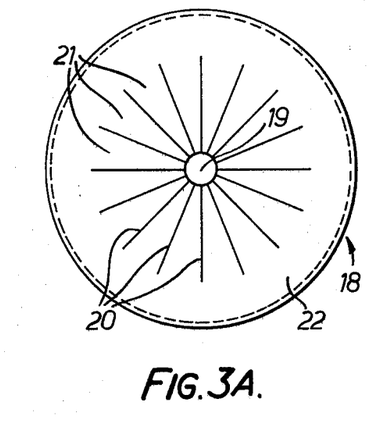
FIGS. 3A and 3B are end views of components for use in moulds according to the invention.

Clamped between the bearing cylinder 17 and the inner surface of the sleeve 2 is a circumferential lip 18A integral with and upstanding from a disc 18. The disc 18 is shown in FIG. 3A prior to inclusion in the assembly of FIG. 1 and has an aperture 19 at its centre from which extend radial slits 20. The sectoral portions 21 between the slits 20 are cantilevered relative to a peripheral portion 22 of the disc and in use are bent outwardly (that is, in the opposite direction from the lip 18A) to form an upstanding portion as shown in FIG. 1 so that the sectoral portions lie against the surface of the cable 1 and the peripheral portion 22 prevents ingress of molten polyethylene into the interior of the sleeve 2.

Figure 6:
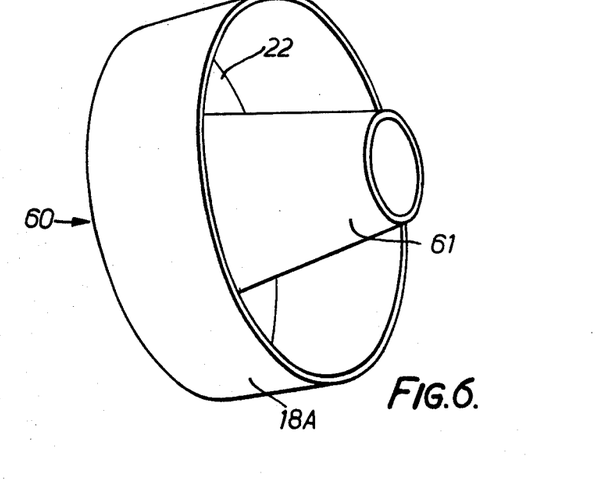
FIG. 6 is an isometric view of an alternative form of the component shown in FIG. 3A.

Alternatively, the disc 18 of FIG. 3A may be replaced by a pre-formed member 60 as shown in FIG. 6. In this case, the portion 22 and the lip 18A are as in FIG. 3A but the deflectable sectoral portions 21 are replaced by a preformed frusto-conical portion 61 upstanding from the portion 22 in the same direction as the lip. When the member 60 is used in a mould assembly as shown in FIG. 1, the cable end is located in the frusto-conical portion 61 and the space between the cone and the cable is then filed with a suitable packing material.

Figure 3B:
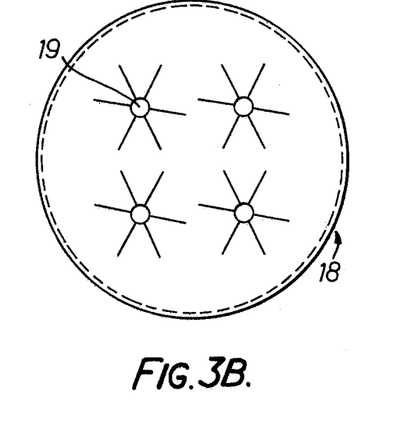

FIGS. 3A and 6 both show sealing members for use when a single cable is to be injection welded to a sleeve, this being the situation illustrated in FIG. 1. It is, however, possible for the assembly of FIG. 1 to be modified for welding several cables to a single sleeve and a sealing member for such a modified assembly is shown in FIG. 3B. This member is generally similar to the disc 18 of FIG. 3A but is for use in welding four cables to a single sleeve and, accordingly, has four apertures 19 each with radially-extending slits. Alternatively of course, the sealing member of FIG. 3B could be replaced by one similar to that of FIG. 6 but having four upstanding frusto-conical portions.

Referring back to FIG. 1 there is shown part of an injection gun 23 for injecting molten polyethylene into the mould. The gun 23 has an upper cylindrical portion 24 and a lower block portion 25. A piston 26 is slidably mounted in a bore in the cylindrical portion 24 and is pressed downwardly to inject the molten polyethylene into the mould. An aperture 27 is formed in the wall of the upper cylindrical portion 24 to enable periodic insertion of a charge of solid polyethylene to re-load the injection gun 23.

The block portion 25 is some way downstream of the aperture 27 and has several elongate bores 28 extending therethrough. Two such bores are shown in FIG. 1 but it is to be understood that the bores are spaced symmetrically around the central axis of the gun 23. The aggregate cross-sectional area of the bores 28 is less than the cross-sectional area of the bore of the cylindrical portion 24 and the bore formation thus gives rise to turbulence in the polyethylene passing from the cylindrical portion 24 to the mould 3.

The lower ends of the bores 28 are in fluid communication with a funnel-shaped exit nozzle 30. The lower end of the nozzle 30 has a cylindrical flange 31 which can be fitted inside the stem 6 of the mould 3 to provide sealing engagement between the gun 23 and the mould 3. Heating cartridges may be disposed within the block portion 25 of the gun 23 to heat the polyethylene as it passes along the bores 28. Alternatively, the polyethylene can be heated as it passes through the stem 6 by an electrical heating element surrounding the flange 31 as shown in FIG. 1.

Figure 4:
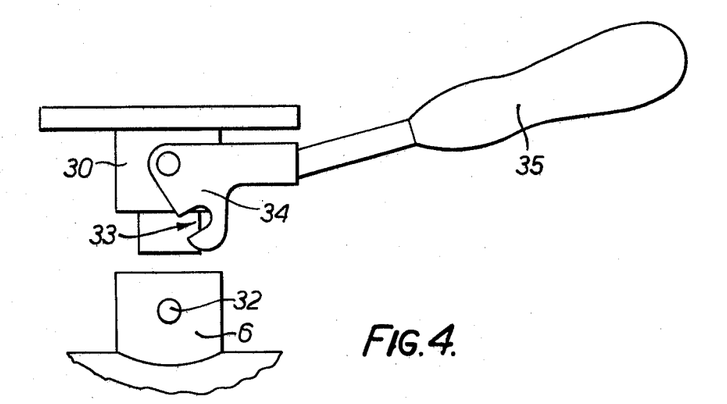
FIG. 4 illustrates the fastening of an injection gun to a mould.

A fastening mechanism for fastening the gun to the mould is shown in FIG. 4. The fastening includes a stud 32 (also shown in FIG. 2) which protrudes from the outer surface of the guideway 6. The stud is engageable within a recess 33 in a plate 34 which is rotatably mounted on the outer surface of the nozzle 3. The recess has a camming inside edge, the camming engagement between the recess edge and the stud 32 ensuring a secure clamping engagement between the gun 23 and the mould when the plate 34 is rotated so that the stud 32 enters the recess. A handle 35 enables application of appreciable force when producing the camming engagement between the plate 34 and the stud 32.

The moulding apparatus is operated in the following way.

The bearing cylinder 17 is inserted into the end of the sleeve 2 and the disc 18 is located so that its lip 18A engages between the cylinder 17 and the sleeve 2. The sectoral portions 21 of the disc are then bent outwardly and the cable end portion is slid through the aperture produced, the sectoral portions 21 then engaging tightly against the outer surface of the cable 1.

The mould sections 4, 9 and 12 are then assembled so that the central section 9 surrounds the actual cable/sleeve junction and the first and second sections 4 and 12 are located to surround respectively the cable 1 and the sleeve 2, the nylon sleeve 14 being located so that the annular projection 16 engages in the annular recess 15. The sleeve 14 and the mould section 9 have curved surface portions 37 which ensure that the finished weld has a rounded outer contour, the weld thus being less susceptible to damage when struck forcibly.

The flanged end of the first mould section 4 is located in the bore of the central section 9 and the flange 7 is then bolted to the central section. Adhesive tape is wrapped around the cable as shown at 36 in FIG. 1 to produce an enclosed mould cavity. The tape may alternatively be wrapped before mould assembly so as to be located within the confines of the first mould section 4 or alternatively can be replaced by an inwardly extending annular flange integral with the first mould section (not shown).

The three mould sections 4, 9 and 12 are securely clamped around the cable/sleeve junction by suitably shaped clamping clips (not shown) and the injection gun 23 is fastened to the first mould section 4 as described with reference to FIG. 4.

The injection gun 23 is loaded with charges of polyethylene through the aperture 27 and the heating elements surrounding flange 31 and the cartridge heaters 10 are switched on. The piston 26 is then driven under pneumatic pressure from an air source (not shown) to press the polyethylene material along the bore of the upper cylindrical portion 24, the bores 28, the nozzle 30, and the stem 6 and into the mould cavity.

The polyethylene is heated by the heating element surrounding the flange 31 and by the time it reaches the mould cavity it is molten. Once in the cavity, the molten polyethylene in contact with the central mould section 9 is maintained at a high temperature by virtue of the heating effect of the cartridges 10. The melt spreads to all parts of the mould cavity and melts the surface portions of both the cable 1 and the sleeve 2 which it contacts. The air in the mould cavity is vented through spew holes (not shown) in a manner well known in the art.

The nylon sleeve 14 acts as a heat insulator to prevent the major portion of the outer surface of sleeve 2 from melting under the influence of heat transmitted from the block 9 of the mould.

When sufficient molten polyethylene has been injected to fill the mould cavity, the heating cartridges 10 are switched off and cooling fluid is passed through the pipes 11. The polyethylene then solidifies so that a weld is formed between the cable 1 and the sleeve 2.

The air pressure on the piston 26 may be maintained so that any contraction occurring when the polyethylene solidifies is taken up thereby preventing the formation of voids in the weld. Preferably though, the injection gun 23 is removed and is replaced by a simple pressurized piston device (not shown) so that the gun 23 can be re-used, for example in forming a weld between the other end of the sleeve 2 and another cable as would be necessary when individual conductors of the two cables have been electrically jointed and the joints deposited in the sleeve 2. When the thermoplastic material has completely solidified, the mould sections 4, 9 and 12 are removed.

The pneumatic circuit which controls movement of the piston 26 of the injection gun is preferably responsive to the temperature of the gun so that forward movement of the piston to discharge polyethylene takes place only when the gun temperature reaches a predetermined level. Advantageously, the pneumatic control circuit is also responsive to the temperature of the mould: to achieve this, two interlockable relays may be provided the conditions of which are dependent on the temperature of (and which, in turn, control the supply of heat to) the gun and the mould respectively, the pneumatic control circuit operating only when the relays are interlocked.

The polyethylene used to make the weld is chosen to have a melt flow index which is about the same as that of the polyethylene sheathing of the cable 1 and the material of the sleeve 2 so that the injected polyethylene and the melted material from the surface of the cable 1 and the sleeve 2 form a homogeneous molten mass. For grade 3 polyethylene an operating temperature of 350° C is attained.

It is considered an advantage of the above-described embodiment that the mould injection port 5 is located in the mould section 4 because the injection polyethylene is then at its hottest when it contacts the cable 1. Accordingly, although the cable acts detrimentally as a heat sink since it houses metal conductors, there is little chance of the injected polyethylene cooling sufficiently to solidify before the mould cavity is filled. In that part of the cavity adjacent the cable/sleeve junction the molten polyethylene is cooler but is more efficiently insulated and, again, unlikely to cool sufficiently to solidity before the mould cavity is filled. If, on the other hand, in the above-described embodiment the molten polyethylene were to be injected into the mould at a location nearer to the junction then there would be a danger of the molten polyethylene solidifying before it filled the part of the mould cavity surrounding the cable.

Figure 5A:
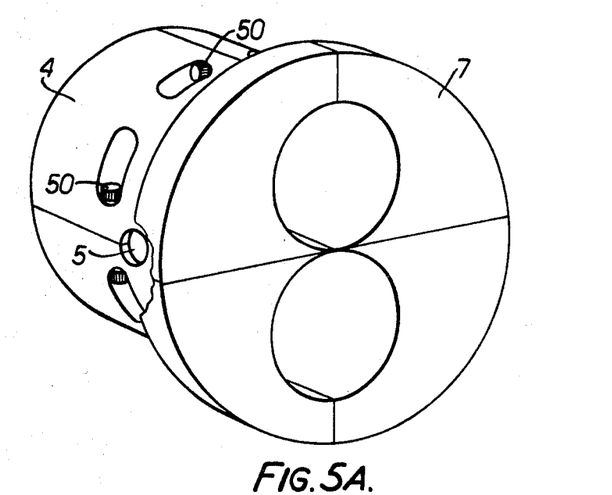
Figure 5B:
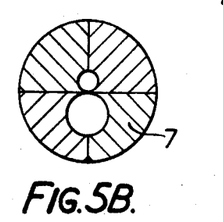
FIGS. 5B and 5C are end views of different forms, of a component of a mould according to the invention.

It was mentioned above that an assembly of the type shown in FIG. 1 can be modified for welding several cables to a single sleeve, and a modified sealing member for four cables is shown in FIG. 3B. It will be appreciated that appropriate modification of the first section 4 of the mould will also be required, and some modified versions are shown in FIG. 5 with corresponding parts carrying the same references. FIG. 5A shows a first section for use in welding two cables to a single sleeve and, to enable the section to be assembled around the cables, it is split longitudinally in two directions at right angles to each other. Bolts for securing the four portions of the mould section together are indicated at 50. FIG. 5B is an end view of a similar mould section for use with two cables of different diameters and FIG. 5C shows a mould section which is split longitudinally into three portions for use with three cables (indicated in dotted lines).

Figure 5C:
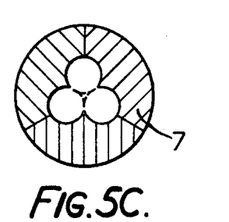

It will be appreciated that, externally, the mould sections shown in FIG. 5 are all similar in shape to the mould section 4 of FIG. 1 and could, accordingly, replace the mould section 4 without any modification of the second mould section 9 or of the injection gun 23.

Figure 7:
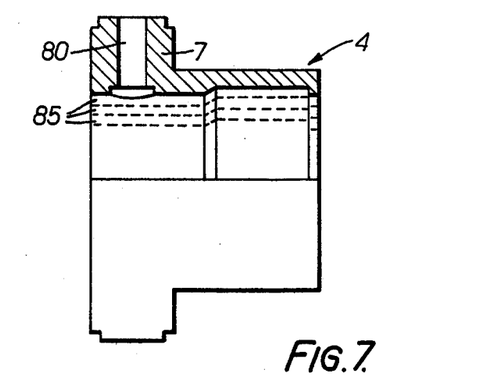
FIG. 7 is a view, partly in section, of the first section of a further mould according to the invention.
Figure 8:
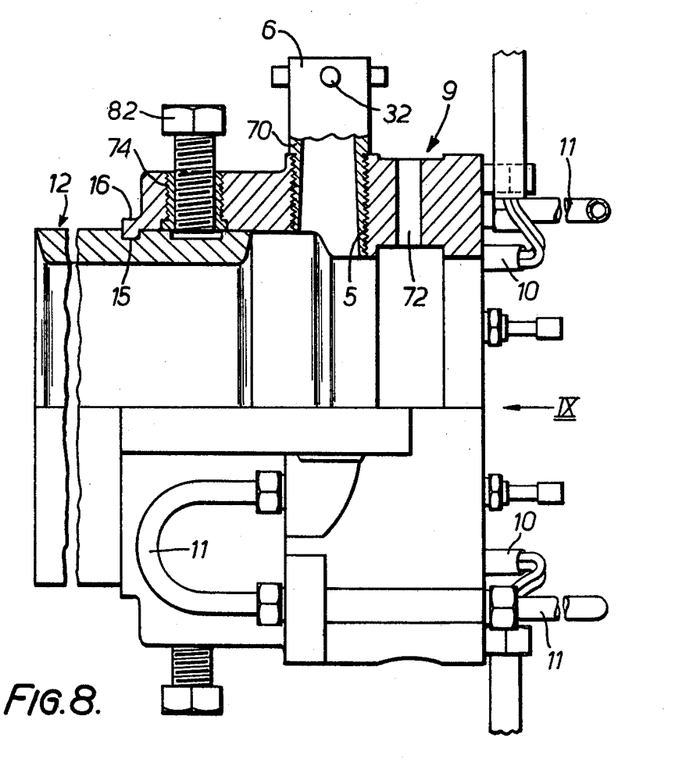
FIG. 8 is a view, partly in section, of the second and third sections of the further mould.
Figure 9:
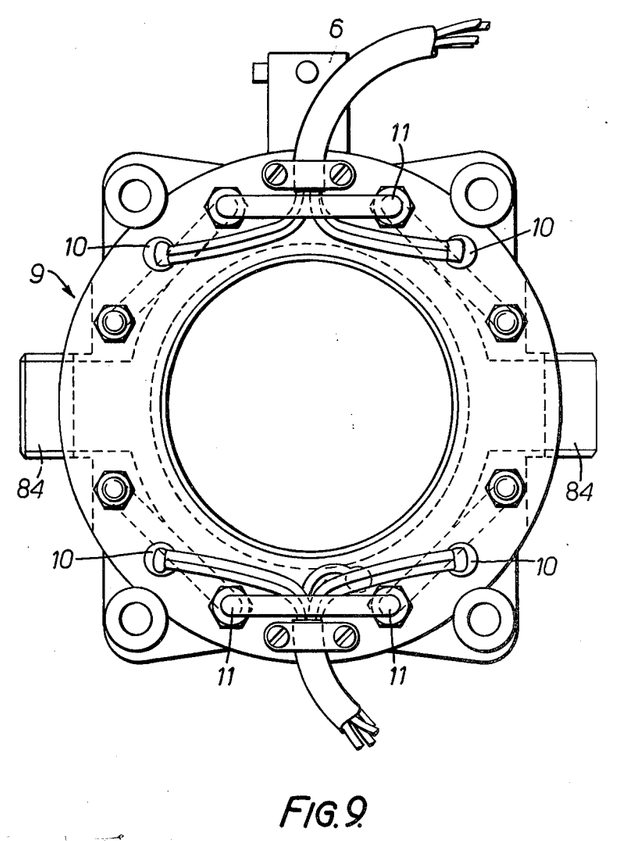
FIG. 9 is a view in the direction of arrow IX in FIG. 8.

Another mould in accordance with the invention is illustrated in FIGS. 7 to 9 of the drawings, and parts corresponding to those in FIGS. 1 and 2 carry corresponding reference numerals. The mould in FIGS. 7 to 9 is shown reversed: that is, in use, the sleeve enters the mould from the left-hand side (rather than the right-hand side as shown in FIG. 1). For simplicity, in the following description, it will be assumed that only one cable end is to be welded to the sleeve although it will be apparent that several cable ends could be welded using sealing members as illustrated in FIGS. 3B and 5.

As in FIG. 1, the mould has a first section 4 (omitted from FIGS. 8 and 9 but shown separately in FIG. 7); a central section 9 and a third section 12. However, the configurations of the various sections differ from those of the earlier embodiment.

The first section 4 (FIG. 7) is formed of a suitable heat-conductive material, for example an aluminium alloy and has a cylindrical bore for receiving the cable end portion (not shown). The section is split longitudinally into two parts in the manner illustrated in FIG. 2 and has a flange 7 at one end. The flange 7 is of substantial thickness and, in each of the two parts of the section, is formed with a radially-extending bolt hole 80. The purpose of the hole 80 is to receive bolts (not shown)

which, in use, affix a number of semi circular section shims 85 (indicated in dotted lines) whereby the radius of the bore through the first section can be altered. The mould section 4 differs from that of FIG. 1 in that it does not incorporate the inlet port 5 of the mould and in that a substantial portion of it is intended to be located with the central mould section 9 as will be described below.

The inlet port 5 is located, instead, in the central mould section 9. This section is also formed of a suitable heat-conductive material, for example an aluminium alloy, and is also split longitudinally into two parts. The section has a bore which is stepped in the region of the inlet port 5, having a reduced diameter towards the cable end of the mould and, as in FIG. 1, this mould section embodies heaters 10 and also ducts 11 for the circulation of cooling fluid.

An insert piece 70 with a tapered bore is screwed into the inlet port 5 to provide the upstanding hollow stem 6 and stud 32 for connection to an injection gun as described with reference to FIG. 4.

Two radially-extending bolt holes 72 are formed towards the cable end of the central mould section 9, to be aligned with the holes 80 in the first mould section 4 when the mould is assembled as will be described below. Two further bolt holes 74, formed towards the other end of the central mould section 9 receive bolts 82 which facilitate removal of the mould-section from a completed cable/sleeve weld.

The third mould section 12 comprises a longitudinally-split cylindrical member for receiving the sleeve to which the cable end is to be welded. The section is formed of a suitable heat-insulating material, for example nylon, and fits inside the larger diameter end of the central mould section 9, as shown in FIG. 8. When so positioned, an annular recess 15 in the mould section 12 receives an annular projection on the central section 9 to prevent relative longitudinal movement between the sections.

In use, the mould is assembled around a cable/sleeve junction in a manner similar to that already described with reference to FIGS. 1 and 2. Firstly, a bearing cylinder (as shown at 17 in FIG. 1) is inserted into the sleeve to be welded, and a sealing disc (FIG. 3A) is located between the sleeve and the cable to prevent molten polyethylene from entering the sleeve when the weld is effected. The longitudinally-split mould sections 4 and 12 are then assembled around the cable and the sleeve, respectively, and are surrounded in turn by the central section 9 which bridges the gap between the other two sections and surrounds the actual cable/sleeve junction. Location of the central section 9 relative to the section 12 is aided, as already described, by the recess 15 and projection 16, while location of the section 9 relative to section 4 is aided by an internal recess 76 in section 9, which receives the flange 7. The holes 72, 80 in the sections 4 and 9 are then aligned and bolts are inserted to prevent relative rotation between the two sections. Finally, the completed mould is secured around the cable/sleeve junction by bolting together the two parts of the section 9 at flanges 84 (FIG. 9).

An injection gun is attached to the upstanding stem 6 surrounding the inlet port, and is operated to inject polyethylene into the mould cavity. During the injection of polyethylene, the heaters 10 in the central mould section 9 are switched on, heating the central section and, with it, the first mould section 4. The polyethylene within the mould cavity is thus maintained at a high temperature and can spread to all parts of the cavity, melting those surface portions of the cable and sleeve which it contacts.

The welding operation then continues in the manner already described with reference to FIGS. 1 and 2 and need not be described further.

The particular configuration of the mould parts described with reference to FIGS. 7 and 8 ensures that, although the inlet port 5 is located in the central section 9, the detrimental heat sink effect of the cable is nevertheless offset. This is achieved by the location of a substantial portion of the first mould section 4 within the central section 9 whereby, when the heaters 10 are in operation, the latter acts as a heating jacket and ensures that the first section is maintained at a high enough temperature to prevent solidification of the polyethylene within the mould cavity. In addition the use of the shims 85 ensures that the mould cavity immediately adjacent the cable end is of a narrow radial thickness; consequently polyethylene in the cavity is, during the injection operation, always close to the indirectly heated mould section 4.

We claim:

1. The method for joining an outer thermoplastics sheath of a cable end portion and an end portion of a thermoplastics sleeve disposed about said sheath, comprising (A) disposing about the cable end portion a sealing disc having an aperture therein and a generally axially extending lip projecting from a major peripheral edge thereof,
   (B) disposing said lip between said end portion of said sleeve and an end of a supporting cylindrical member within said sleeve and clamping said lip between said member and said sleeve,
   (C) enclosing said end portions including said disc in a mould cavity, and
   (D) injecting molten thermoplastics material compatible with said sleeve and said sheath into said cavity and about said sheath and said end portion of said sleeve to weld them together.

2. A method as claimed in claim 1 including the steps of heating the mould adjacent the junction while the thermoplastics material is being injected into the mould cavity and then, while maintaining the material in the cavity under a predetermined pressure, cooling the mould adjacent the junction.

3. A method as claimed in clam 1, in which the disc has a portion, disposed about said aperture, which is formed with slits radiating from said aperture and adapted thereby to embrace said sheath.

4. A method as claimed in claim 1, in which clamping pressure for clamping said lip between said cylindrical member and said sleeve is applied by locating about said sleeve the mould providing said mould cavity.

5. A method as claimed in claim 1, in which the disc has an upstanding inwardly-tapered portion disposed about said aperture and adapted to embrace said sheath.

6. A method as claimed in claim 5 and further including the step of disposing packing material in the space between the sheath and said upstanding inwardly-tapered portion of the disc.

7. A mould assembly for injection welding an outer thermoplastics sheath of a cable end portion to an end portion of a thermoplastics sleeve disposed about said sheath, comprising (A) a supporting cylindrical member locatable within said sleeve to provide a support therefor, (B) a sealing disc shaped to extend between said sheath and said sleeve to exclude injected material from the interior of said sleeve, said disc having an aperture therein and being adapted to embrace said sheath, and having a generally axially extending lip projecting from a major peripheral edge thereof and locatable between said end portion of said sleeve and an end of said supporting cylindrical member within said sleeve and (C) a mould adapted to enclose said end portions in a mould cavity, the mould including a portion locatable about said sleeve to clamp said lip between said sleeve and said cylindrical member.

8. A mould as claimed in claim 7, including an inlet port and a piston-and-cylinder assembly connected to the inlet port and operable to force molten thermoplastics material through the inlet port, a part of the cylinder being of multi-bore formation whereby molten thermoplastics material being forced through the cylinder undergoes turbulence.

9. A mould assembly as claimed in claim 7, in which the disc has a portion, disposed about said aperture, which is formed with slits radiating from said aperture and adapted thereby to embrace said sheath.

10. A mould assembly as claimed in claim 7, in which the disc has an upstanding inwardly-tapered portion disposed about said aperture and adapted to embrace said sheath.

11. A mould assembly as claimed in claim 7, in which the mould comprises first, second and third mould parts, the first part being of heat-conductive material with a bore for receiving said cable end portion and the third part being of heat-insulating material with a bore for receiving said sleeve, the second part being of heat-conductive material with a bore of larger diameter than the first and third parts and being shaped at opposite ends thereof to receive at least an end portion of the first and third parts and to co-operate therewith to prevent relative axial and radial movement between the said mould parts.

12. A mould as claimed in claim 9, in which the first mould part has an inlet port for admitting molten thermoplastics material into the bore, the inlet port being at a location spaced apart from the region of co-operation between the first and second mould parts.

13. A mould as claimed in claim 9, in which the second mould part has an inlet port for admitting molten thermoplastics material into the bore, a substantial portion of the first mould part being located within the second mould part.

14. A mould as claimed in claim 9, in which the second mould part includes means for heating and means for cooling the second mould part.

* * * * *